(12) United States Patent
Cao et al.

(10) Patent No.: US 10,394,901 B2
(45) Date of Patent: Aug. 27, 2019

(54) METHOD AND SYSTEM FOR RESOLVING SEARCH QUERY AMBIGUITY IN A PRODUCT SEARCH ENGINE

(71) Applicant: Wal-Mart Stores, Inc., Bentonville, AR (US)

(72) Inventors: Tri Minh Cao, San Bruno, CA (US); Abhishek Gattani, Sunnyvale, CA (US); Srikanth Subramaniam, San Jose, CA (US); Heather Marie Sevrens, Menlo Park, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 196 days.

(21) Appl. No.: 13/847,993

(22) Filed: Mar. 20, 2013

(65) Prior Publication Data
US 2014/0289211 A1 Sep. 25, 2014

(51) Int. Cl.
G06F 7/00 (2006.01)
*G06F 16/951* (2019.01)
*G06F 16/332* (2019.01)
*G06F 16/33* (2019.01)

(52) U.S. Cl.
CPC ........ *G06F 16/951* (2019.01); *G06F 16/3325* (2019.01); *G06F 16/3346* (2019.01)

(58) Field of Classification Search
CPC ......... G06F 17/30864; G06F 17/30687; G06F 17/30646
See application file for complete search history.

(56) References Cited

U.S. PATENT DOCUMENTS

| | | |
|---|---|---|
| 6,931,397 B1 | 8/2005 | Sundaresan |
| 7,085,690 B2 | 8/2006 | Sale |
| 7,472,135 B2 | 12/2008 | Huuskonen |
| 7,672,833 B2 | 3/2010 | Blume |
| 8,041,710 B2 | 10/2011 | He |
| 8,291,319 B2 | 10/2012 | Li |
| 8,321,427 B2 | 11/2012 | Stampleman |

(Continued)

OTHER PUBLICATIONS

Jeff Huang et al: "Analyzing and evaluating query reformulation strategies in web search logs", Proceeding of the 18th ACM Conference on Information and Knowledge Management, CIKM '09, Nov. 2, 2009 (Nov. 2, 2009), p. 77, XP055123569.

(Continued)

*Primary Examiner* — Paul Kim
(74) *Attorney, Agent, or Firm* — Bryan Cave Leighton Paisner LLP

(57) ABSTRACT

Techniques for providing improved search results for queries are provided. The techniques include obtaining a candidate pair from a query log comprising a single word unigram and a two word bigram which expresses the same content as the unigram, receive customer interaction data from the query log for the unigram and the bigram, and determining if the candidate pair includes a dominant form, equivalent form, or un-comparable pair. The techniques also include creating a rule regarding treatment of the unigram or bigram in analyzing a query. The techniques further include receiving a query, analyzing the query to identify modified query results according to the rule, and presenting the query results.

22 Claims, 9 Drawing Sheets

(56) References Cited

U.S. PATENT DOCUMENTS

| | | | |
|---|---|---|---|
| 8,326,826 B1 | 12/2012 | Upstill | |
| 2003/0154071 A1* | 8/2003 | Shreve | G06F 17/2845 704/9 |
| 2005/0091030 A1* | 4/2005 | Jessee et al. | 704/4 |
| 2009/0171813 A1* | 7/2009 | Byrne et al. | 705/27 |
| 2011/0295897 A1* | 12/2011 | Gao et al. | 707/780 |

OTHER PUBLICATIONS

Yanen Li et al: "A generalized hidden Markov model with discriminative training for query spelling correction", Research and Development in Information Retrieval, ACM, 2 Penn Plaza, Suit 701 New York, NY 101021-0701 USA, Aug. 12, 2012 (Aug. 12, 2012), pp. 611-620, XP058009035.

Jiafeng Guo et al: "A unified and discriminative model for query refinement", Proceedings of the $31^{st}$ Annual International ACM SIGIR Conference on Research and Development in Information Retrieval (SIGIR '08), Jul. 20, 2008 (Jul. 20, 2008), p. 379, XP055123572, New York, USA.

\* cited by examiner

METHOD AND SYSTEM FOR RESOLVING SEARCH QUERY AMBIGUITY IN A PRODUCT SEARCH ENGINE

BACKGROUND INFORMATION

Field of the Disclosure

The present invention relates to providing electronic search results to customers. In particular, examples of the present invention relate to an approach for resolving ambiguity in search terms or queries which have been entered by a customer to thereby provide more relevant and engaging search results to the customer.

Background

Many stores provide customers with the ability to electronically search for products. This may be accomplished through a website. The website may feature items from the store or may offer items for sale. Often, these websites will display/sell a considerable number of items. In many cases, a store website will feature items for sale at brick and mortar locations of the store as well as additional online items not carried in brick and mortar store locations. Store websites may also feature a marketplace where items from other vendors are sold. As stores provide an increasing number of products to customers, it becomes more important that the customer is able to quickly and accurately search for a desired item among those featured on the website. It is important to provide search results which display desired products to the customer and which engage the customer; prompting the customer to complete a purchase transaction.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
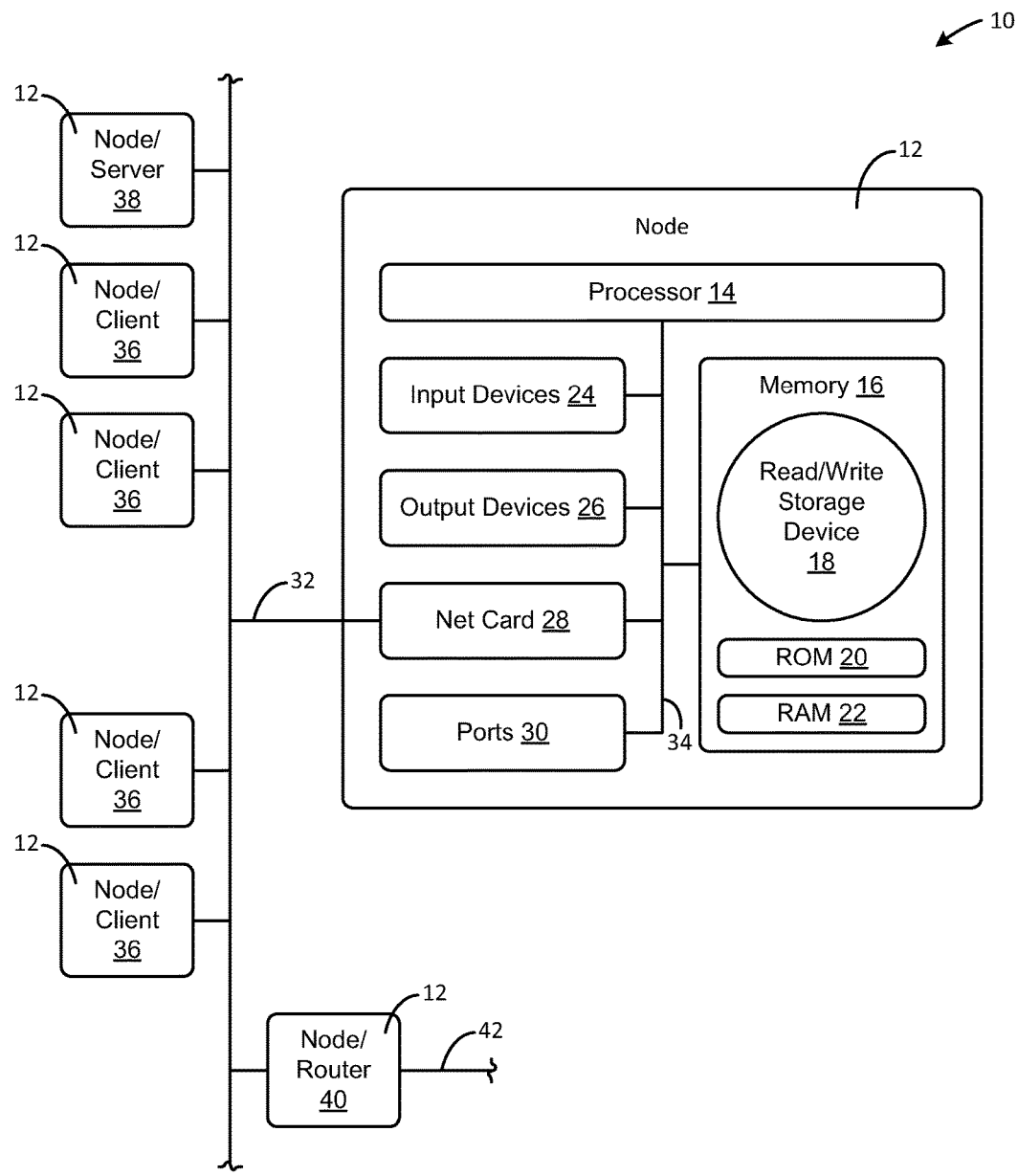
FIG. 1 is a schematic block diagram of a computer system in accordance with the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The disclosure particularly describes how a store product search engine may provide more relevant search results to a customer and thereby increase the likelihood that the customer purchases a product from the store. The store may provide an interactive website to customers. The website may offer products for sale and may include a search engine to allow a customer to search for a desired product by entering search terms. Customers will typically enter search terms (i.e. queries) which describe the product, product attributes, or which attempt to include the name of the product. Often, the customers will enter query terms which do not match the product name or description well and which do not provide adequate search results to the customer. These search terms may not yield adequate search results due to syntactical variations or errors in the search term. The search engine may be programmed to modify query terms according to past search queries and in accordance to customer response to the search queries such that search results presented in response to presently entered search terms more accurately reflect the products that the customer desires to purchase.

Referring to FIG. 1, an example system 10 may assist a human user such as a customer in accessing information such as in searching for a product which the human desires to purchase. The system 10 may provide a search engine which receives a query from a human, analyzes the query, and provides results to the human. The system 10 may receive queries and may provide the search results within a software framework such as an internet browser. According to one example of a system 10, the system 10 may operate on a limited search environment. For example, the system 10 may operate on a single store website or on a store product catalog. As such, the system 10 may analyze information from the website or catalog and provide the user results from the website or catalog. The system 10 may operate directly on data within the search environment or may operate on an index of the search environment as this may provide increased speed in providing search results to a user where the search environment is large.

Human users may enter search queries into the system 10 and receive results from the system 10. For example, a human user may enter a query or request for information into a system 10. The system 10 may respond by providing one or more results or listings to the human. The search results may be provided as a list of html links or the like; each link representing an individual search result (i.e. an individual document). The results or listings may initially be ranked or sorted according to relevance scores. The relevance scores may represent an assessment by the system 10 as to the relevance of the individual search result to the query. The relevance scores may be based on the frequency of occurrence of the search terms, the proximity of the search terms, the locations of the search terms within the result, etc.

Upon receiving search results, the users may interact with the system 10 by interacting with the search results. The users may, from the search results, select a particular link and navigate to the data associated with that link. The user may thus view a particular product within an electronic product catalog or within a store webpage. The user may view several products identified by several different search result links displayed among the search results. The user may select and purchase a product from among the search results. The system 10 may observe and store information about the user's interaction with the search results. Information about the user's interaction with the search results may be stored in a query log with the user query. The query log may thus contain various items of information such as the search terms or query entered by the user, the interaction of the user with the search terms (i.e. which items were viewed by the user), and the resulting action taken by the user (purchasing a product, no purchase, etc.).

In selected embodiments, a system 10 may apply an algorithm to generate modified search results. Accordingly, in response to query, a system 10 may provide modified results or listings based on query term modification criterion. In certain embodiments, search results may be provided based on modifications to the search terms entered by the user. Accordingly, a present user query may be modified according to the search results and the user interaction (browsing/purchase) with the search results from a query log of previous search results from other users and the present user may be provided with search results based on the modified query rather than the user provided query.

A system 10 in accordance with the present invention may provide, enable, or support the generation and/or application of modified queries in any suitable manner. In certain embodiments, a system 10 may be embodied as hardware, software, or some combination thereof. For example, in selected embodiments, a system 10 may include one or more nodes 12.

A node 12 may include one or more processors 14 or central processing units (CPUs) 14. A node 12 may also include memory 16. Such memory 16 may be operably connected to a processor 14 and include one or more devices such as a hard drive 18 or other non-volatile storage device 18, read-only memory (ROM) 20, random access memory (RAM) 22, or the like or a combination or sub-combination thereof. In selected embodiments, such components 14, 16, 18, 20, 22 may exist in a single node 12. Alternatively, such components 14, 16, 18, 20, 22 may be distributed across multiple nodes 12.

In selected embodiments, a node 12 may include one or more input devices 24 such as a keyboard, mouse, touch screen, scanner, memory device, communication line, and the like. A node 12 may also include one or more output devices 26 such as a monitor, output screen, printer, memory device, and the like. A node 12 may further include a network card 28, port 30, or the like to facilitate communication through a computer network 32. Internally, one or more busses 34 may operably interconnect various components 14, 16, 24, 26, 28, 30 of a node 12 to provide communication therebetween. In certain embodiments, various nodes 12 of a system 10 may contain more or less of the components 14, 16, 24, 26, 28, 30, 34 described hereinabove.

Different nodes 12 within a system 10 may perform difference functions. For example, one or more nodes 12 within a system 10 may function as or be clients 36. Additionally, one or more nodes 12 within a system 10 may function as or be servers 38. Accordingly, a system 10 may include one or more servers 38 or the like serving files, data, applications, etc. to one or more clients 36 connected thereto. A system 10 may also include one or more nodes 12 that function as or are routers 40 and the like. Accordingly, one computer network 32 may be connected to other computer networks 42 via one or more routers 40.

Figure 2:
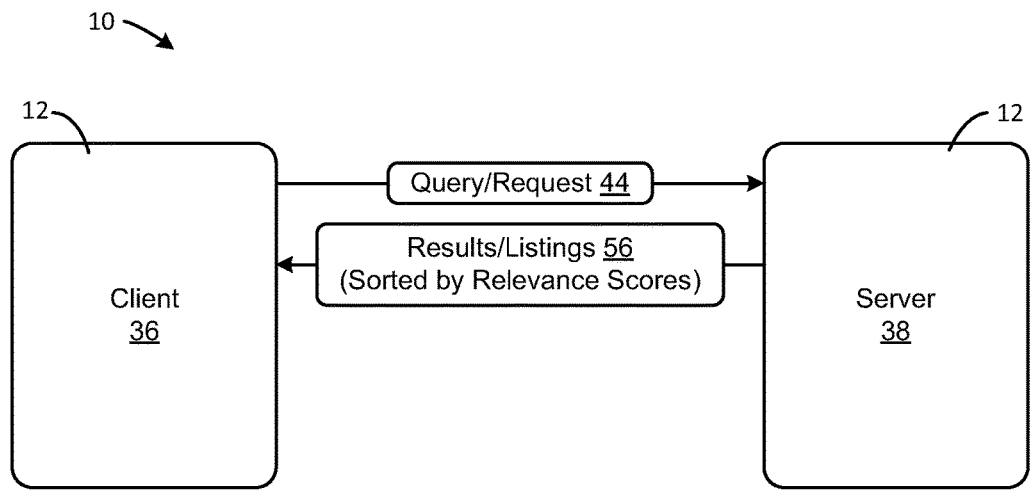
FIG. 2 is a schematic block diagram of communication that may occur between different nodes of a computer system in accordance with the present invention.
Figure 3:
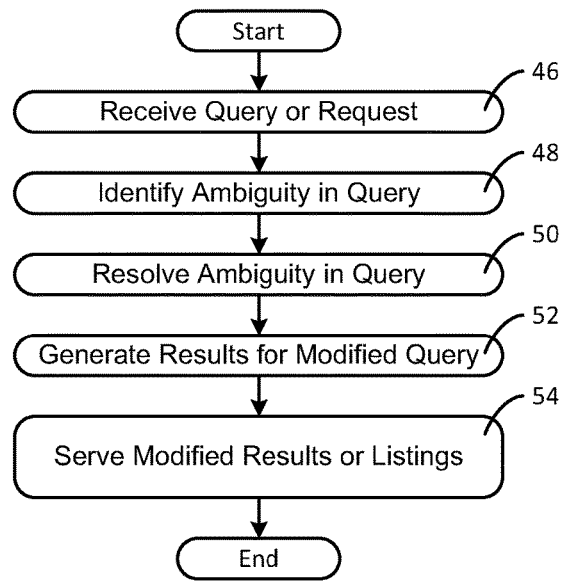
FIG. 3 is a schematic block diagram of a method that may be executed by a computer system in accordance with the present invention.

Referring to FIG. 2 and FIG. 3, in selected embodiments, a system 10 may provide, enable, or support the generation of modified search queries in the context of an exchange between nodes 12. For example, modified search queries may be used in connection with one or more exchanges between a client 36 and server 38. Accordingly, modified search queries may be applied to a plurality of listings passed between a client 36 and server 38.

For example, a client 36 may pass a query 44 or request 44 to a server 38. In general, such a query 44 or request 44 may be directed to certain content stored on, or accessed through, the server 38. Such content may have any suitable subject, combination of subjects, structure, or the like. For example, the content may comprise web pages, web postings, product listings (e.g., goods or services offered for sale), or the like or a combination or sub-combination thereof. In one example, a client 36 may pass a query 44 to a server 38 which relates to a product or products. The desired content may comprise web pages describing the product(s) and product listings offering the product(s) for sale. Particularly, the server 38 may store content related to a store website which offers the product(s) for sale to customers.

A server 38 may receive 46 the query 44 or request 44 and respond in any suitable manner. In one example, a server 38 may identify ambiguity 48 in a received query 44. Particularly, the server 38 may identify ambiguity in the words selected by a user in formulating the query 44. Frequently, a user will inter words for a query 44 which do not well match the description or name of a desired product. The server 38 can identify 48 this ambiguity in the query terms 44 and resolve 50 this ambiguity. The server may then process the modified query and generate 52 modified search results corresponding to the modified query terms. Accordingly, a server 38 may respond by serving 54 a plurality of listings 56 that are more likely to be relevant to the user submitting such a query 44.

The flowchart in FIG. 3 illustrates the architecture, functionality, and operation of possible implementations of systems, methods, and computer program products according to certain embodiments of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on one or more clients 36, servers 38, or combinations or sub-combinations thereof. In selected embodiments, one or more clients 36 and servers 38 may be positioned remotely with respect to one another. Accordingly, such nodes 12 may be connected to one another through any type of network, including a local area network (LAN) or a wide area network (WAN), or the connection may be made through the Internet using an Internet Service Provider.

Selected embodiments in accordance with the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 4:
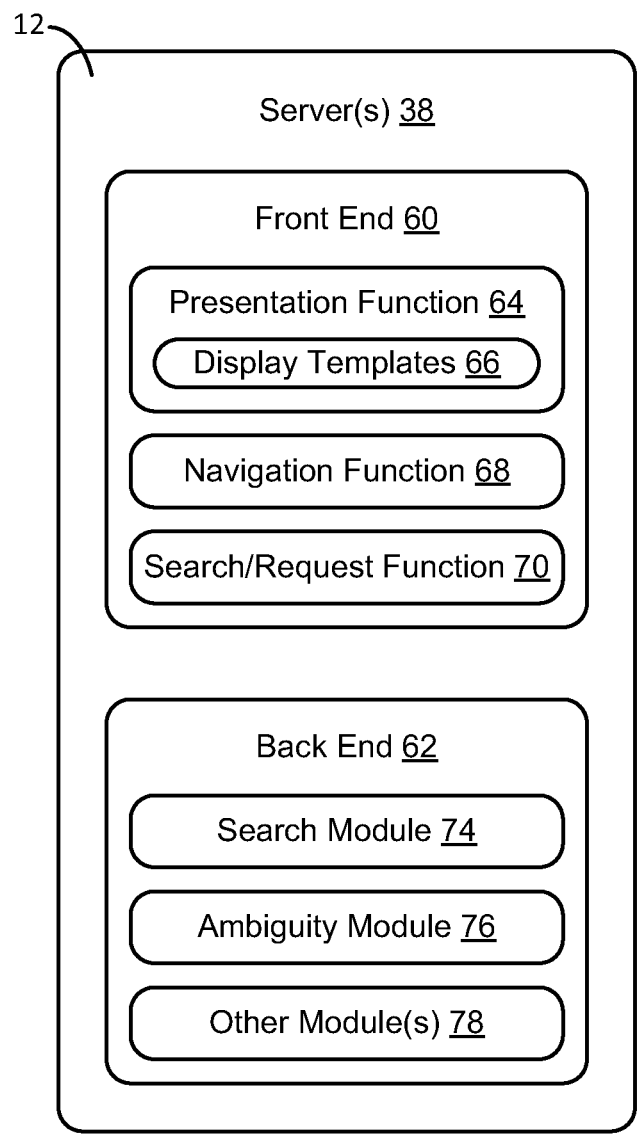
FIG. 4 is a schematic block diagram of a server or server system in accordance with the present invention.
Figure 5:
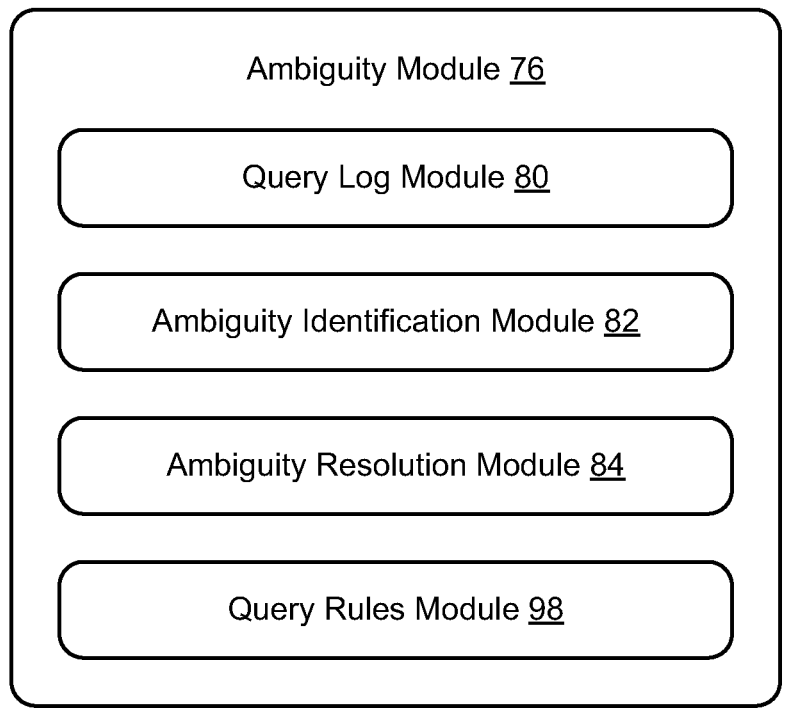
FIG. 5 is a schematic block diagram of one embodiment of an ambiguity resolution module in accordance with the present invention.

Referring to FIG. 4, in selected embodiments, a system 10 in accordance with the present invention may include one or more servers 38 supporting a website, mobile application, or the like or a combination thereof. One or more such servers 38 may comprise or support a "front end" 60 and/or a "back end" 62. A front end 60 may provide or support a user interface viewed or utilized by the human users of one or more clients 36. A back end 62, on the other hand, may perform, provide, or support the behind-the-scene work of processing queries, sorting listings, or the like or a combination thereof.

In certain embodiments, selected functions that may typically be associated with a front end 60 of a server 38 may be off loaded to one or more clients 36. For example, an application (e.g., a web browser or a mobile application) installed on a client 36 (e.g., a desktop computer, laptop computer, tablet computer, smart phone, electronic reader, music player, or the like of a human user) may provide a user interface for a system 10 in accordance with the present invention. Accordingly, in selected embodiments, one or more servers 38 may perform limited functions typically associated with a front end and may perform functions typically associated with a back end 62.

In selected embodiments, a front end 60 may include a presentation function 64 controlling the content and/or content format to be displayed via one or more clients 36 to the respective human users thereof. In certain embodiments, a presentation function 64 may include one or more display templates 66 defining the visual look supported by the front end 60 (e.g., the look of the various pages of a website or views or screens of an application). A front end 60 may also include a navigation function 68. A navigation function 68 may receive commands from a user via a client 36 and direct a presentation function 64 to display other templates, files, pages, screens, views, and the like.

A front end 60 may include a search or request function 70. A search or request function 70 may provide a mechanism through which one or more queries 44 or requests 44 may be passed to and/or received 46 by a server 38. The front end 60 may thus receive 46 queries 44 from customers through a search/request function 70 and may allow customers to view search results through the navigation function 68. The presentation function 64 may serve 54 search results 56 to a customer in the form of html links and the navigation function 68 may allow the customer to browse and view content within the search results 56.

In selected embodiments, a back end 62 may include a search module 74, an ambiguity resolution module 76, one or more other modules 78 as desired or necessary, or the like or a combination or sub-combination thereof. A search module 74 may identify, collect, or compile a plurality of listings 50 or results 50 that are potentially relevant to one or more corresponding queries 44 or requests 44. An ambiguity resolution module 76 may receive queries 44 and identify and resolve ambiguity within the query terms to improve the quality of the search results.

Referring to FIG. 5 through FIG. 8, a system 10 in accordance with the present invention may modify a query 44 to resolve ambiguities in the query 44. In selected embodiments, an ambiguity resolution module 76 may provide, enable, or support such resolution. An ambiguity resolution module 76 may include any suitable arrangement of sub-components or modules and may include a query log module 78, an ambiguity identification module 82, an ambiguity resolution module 84, and other modules as may be necessary.

The ambiguity resolution module 76 may receive a query 44 from the client node 36 and may analyze the query 44 to generate or identify candidate terms which are ambiguous and which may need resolution and may then resolve the ambiguity in those terms. In one example, the server 38 operates in connection with a store website which features products for sale as well as information regarding those products. The query log module 80 may include information regarding previous customer search queries 44 as well as information regarding the customer interaction with the website which resulted from the query results 56. The query log module 80 may include information regarding queries 44, results 56 which are sorted by relevance scores (such as scores which are based on the presence, location, proximity, etc. of the query terms in a candidate result page), and customer interaction with the results 56 (such as views of the result documents or products, purchase of a result product, etc.). The query log module 80 may also include information regarding queries 44, modified results 56 which are the product of modification of the query 44 to resolve term ambiguity, and customer interaction with the results 56. The query log module 80 may thus include a query log which comprises the combined query/results history for the store website as well as the customer interaction with the website resulting from the query/results.

Figure 6:
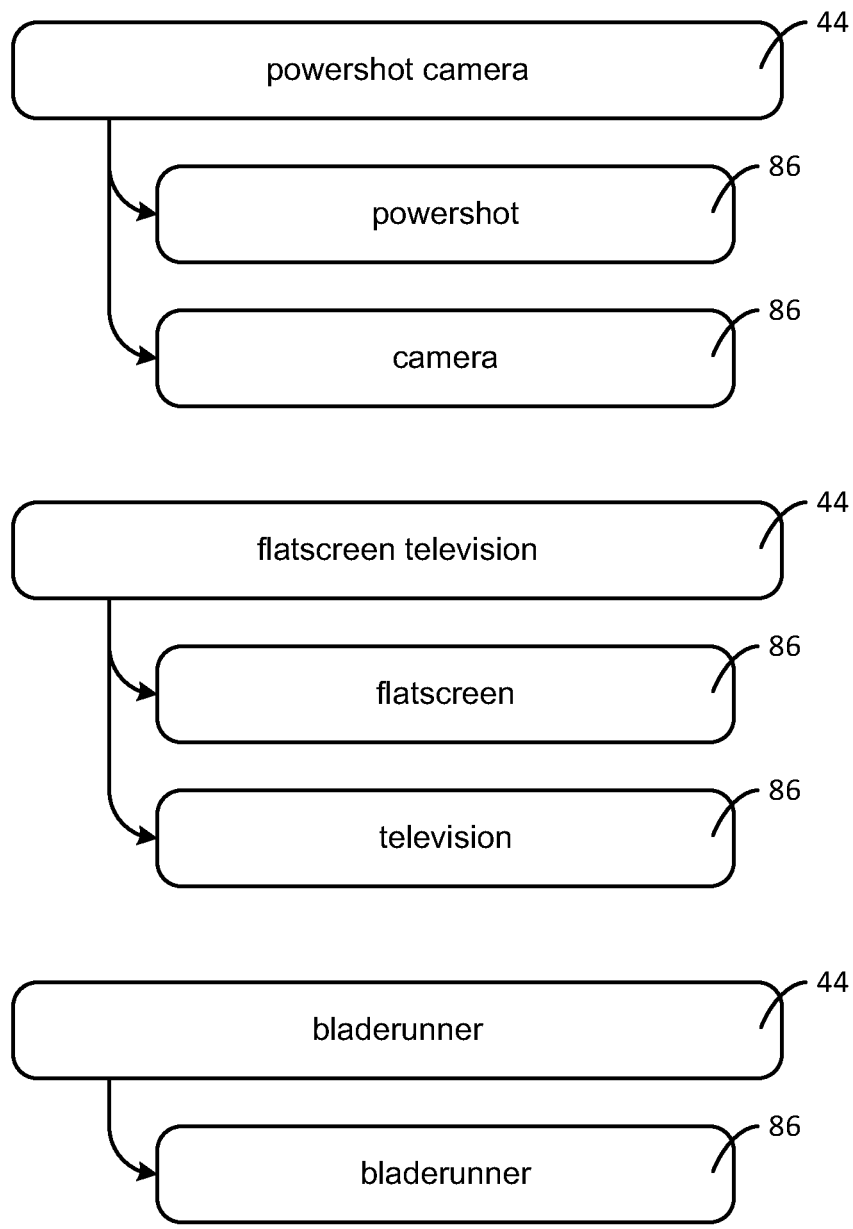
FIG. 6 is an illustration of query analysis in accordance with the present invention.

The ambiguity identification module 82 may analyze the query log to generate unigrams 86 from queries in the query log. Unigrams 86 may be single "words" from the search query. These single "words" may be identified and used even if incorrect. As such, misspelled "words" or "words" which are properly spelled as two words may be retained as valid unigrams. Thus, the query 44 "powershot camera" produces two unigrams 86: "powershot" and "camera." Similarly, the query 44 "flatscreen television" produces two unigrams 86: "flatscreen" and "television." The query 44 "bladerunner" produces a single unigram 86: "bladerunner." These unigrams 86 are shown in FIG. 6.

Figure 7:
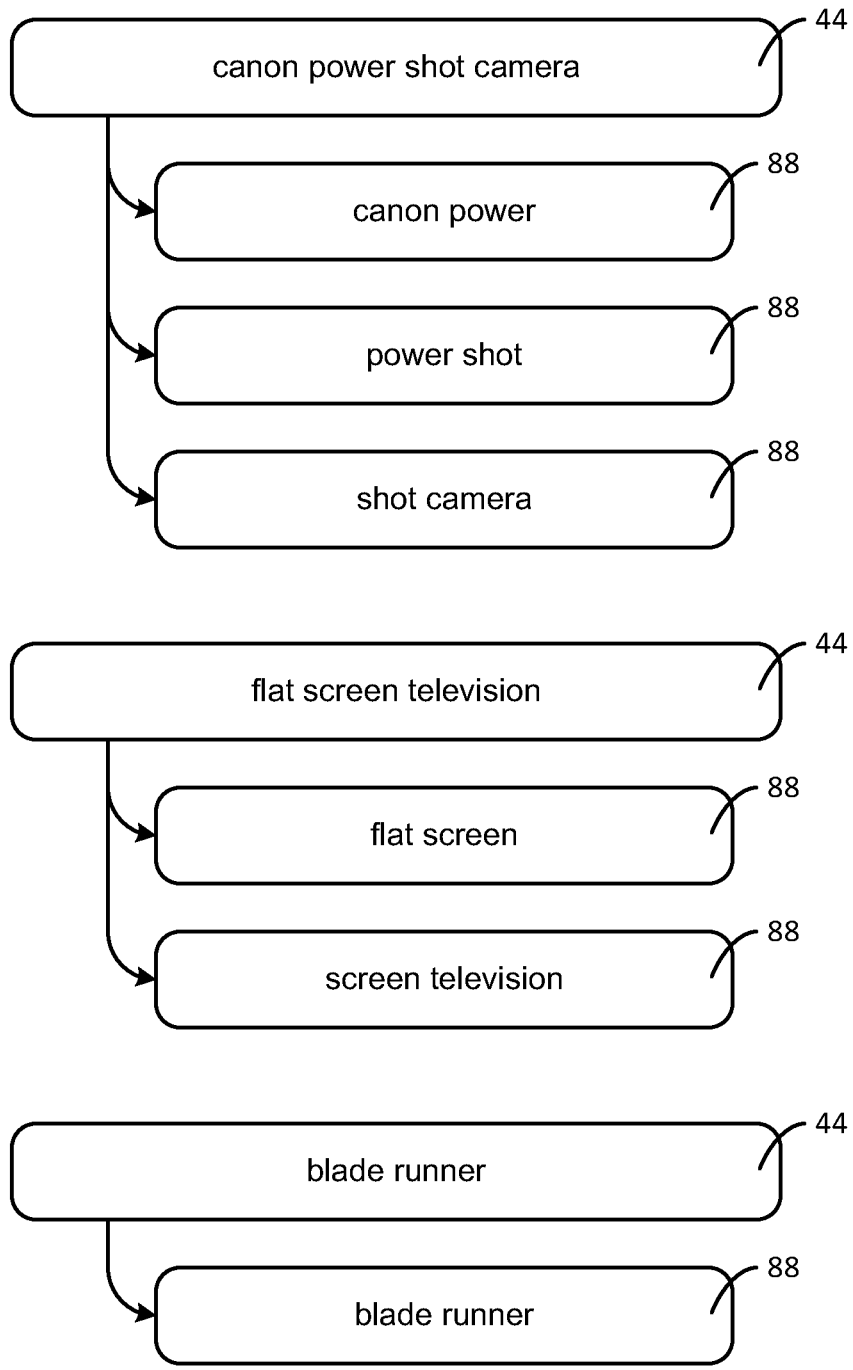
FIG. 7 is an illustration of query analysis in accordance with the present invention.

The ambiguity identification module 82 may also analyze the query log to generate bigrams 88 from the query log. Bigrams 88 may be pairs of adjacent "words" from the search query. These "words" may be identified and used even if incorrect. As such, misspelled "words" or multiple "words" which are properly spelled as a single word may be retained as valid "words" and used to create bigrams 88. Thus, the query 44 "canon power shot camera" will produce three bigrams 88: "canon power", "power shot" and "shot camera." Similarly, the query 44 "flat screen television" produces two bigrams 88: "flat screen" and "screen television." The query 44 "blade runner" produces a single bigram 88: "blade runner." These bigrams 88 are shown in FIG. 7.

Figure 8:
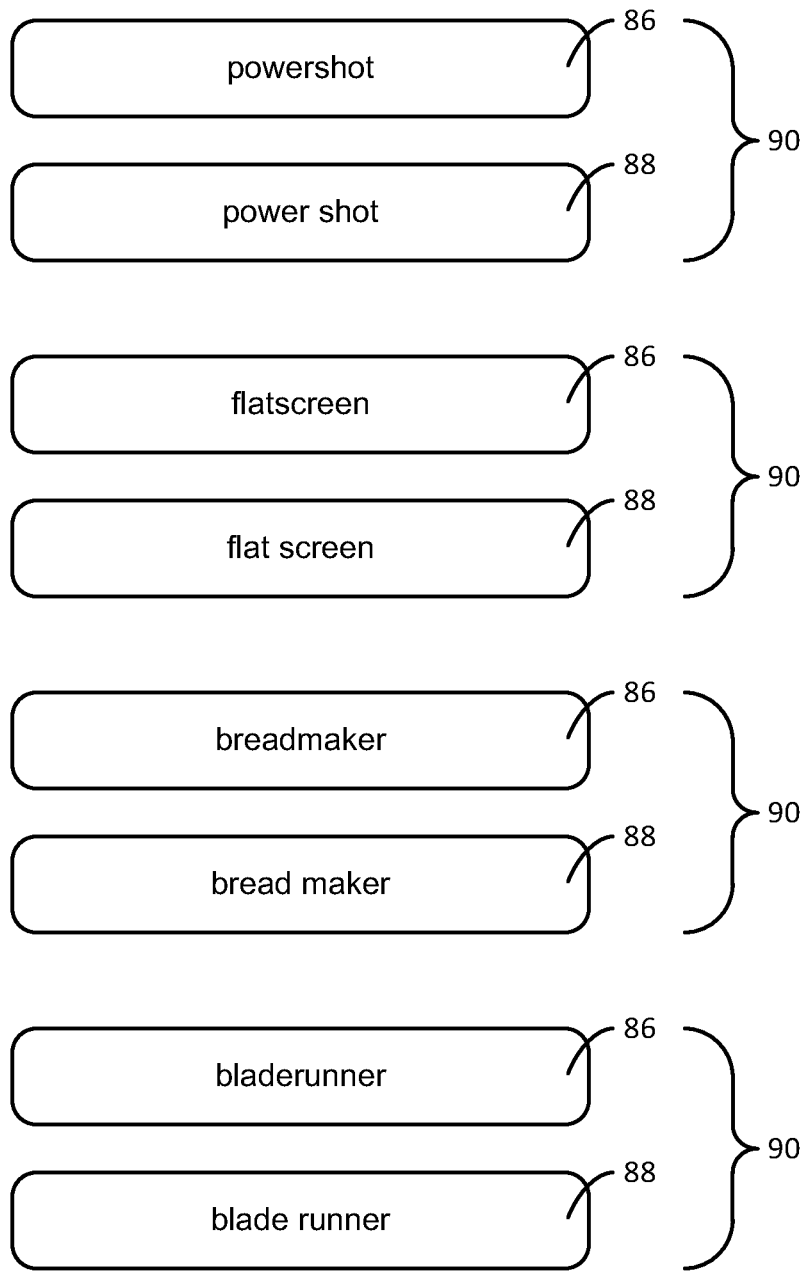
FIG. 8 is an illustration of query analysis in accordance with the present invention.

The ambiguity identification module 82 may analyze the unigrams 86 and bigrams 88 and may match a unigram 86 with a bigram 88 which both contain essentially the same content or "words" presented in different syntactical variations. Thus, the unigram "powershot" is matched with the bigram "power shot." Similarly, the unigram "flatscreen" is matched with the bigram "flat screen" and the unigram "bladerunner" is matched with the bigram "blade runner." These matched unigrams and bigrams are identified as candidate pairs 90, as shown in FIG. 8. Unigrams 86 such as "camera" or "television", or bigrams 88 such as "canon power", "shot camera", and "screen television" may be discarded. Unmatched unigrams and bigrams, by virtue of being unmatched, may be determined to not represent syntactical ambiguity in the query terms entered by customers. The ambiguity identification module may select the top candidate pairs 90 based on the frequency with which the unigrams and bigrams occur in the query log 80.

The ambiguity resolution module 84 may use the query log 80 to resolve the ambiguity presented by the syntactical variations present in the customer presentation of queries to the server 38. Particularly, the ambiguity resolution module 84 may determine the intent of the user in presenting a query 44 from the user behavior (i.e. the user interaction with the store website pages/data/products and with the query results 56) as recorded in the query log 80. The user behavior (interaction with the search results 56 and store website) may show better user interaction from one of the unigram 86 or bigram 88 out of the candidate pair 90. User interaction such as browsing through search result pages or purchasing a product related to the query 44 or search results 56 may confirm the user intent in presenting the query 44.

Figure 9:
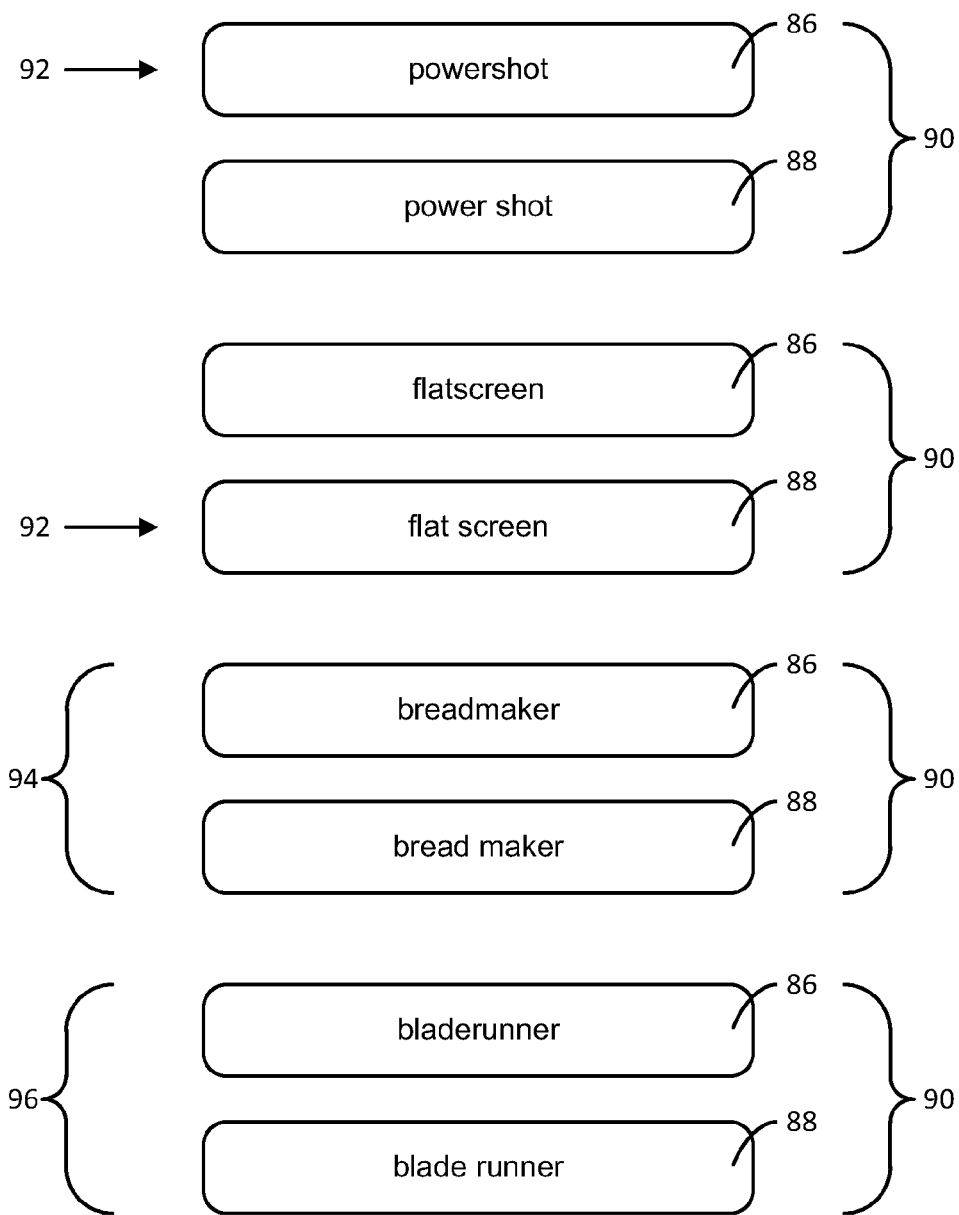
FIG. 9 is an illustration of query analysis in accordance with the present invention.

The ambiguity resolution module 84 may analyze the candidate pairs 90 and the query log user interactions associated with each unigram 86 and bigram 88 to resolve the different syntactical forms with which customers enter query terms 44. Particularly, the ambiguity resolution module 84 may identify and use three kinds of relationships to resolve the candidate pairs 90 as shown in FIG. 9.

In one example, the candidate pair 90 may present a dominant form 92. A dominant form 92 is a unigram 86 or bigram 88 which is much better than the other part of the candidate pair 90 in terms of customer engagement. Where a dominant form is identified in the user interaction data from the query log 80, the minor form can be rewritten as the dominant form 92 in a query 44. For the candidate pair 90 of "powershot" and "power shot", the dominant form 92 is the unigram 86 "powershot" as this term is identified in the user interaction data of the query log as having a better customer engagement with the store products (i.e. a higher incidence of resultant sale of a corresponding product. For the candidate pair 90 of "flatscreen" and "flat screen", the dominant form 92 is the bigram 88 "flat screen".

In one example, the candidate pair 90 may present two equivalent forms 94. For the candidate pair 90 including the unigram 86 "breadmaker" and the bigram 88 "breadmaker", the two query terms are equivalent as both of the terms provide good customer interaction. The two terms provide similar search results 56 for similar items with similar customer engagement/interaction.

In one example, the candidate pair 90 may present a unigram 86 and a bigram 88 which are an un-comparable pair 96 based off of the customer interaction data from the query log 80. The candidate pair 90 including the unigram 86 "bladerunner" and the bigram 88 "blade runner" may be an un-comparable pair 96 as both provide valid search results 56 which both result in good customer interaction data (i.e. customer browsing and purchase data correlated to the search query 44 and results 56). The two terms of an un-comparable pair 96 may each provide search results for different products (such as a movie for one term or sporting goods for the other term) and may each provide good customer interaction and sales.

An un-comparable candidate pair 90 may be presented to a human such as a store product analyst so that this person can decide if the candidate pair 90 presents a dominant form 92 which should be used in queries 44. In some situations, the product analyst may not be able to determine if there is a dominant form 92 and may not create a dominant form 92 for the candidate pair 90. In this situation, the customer can navigate the search results and locate the desired product. As the customer navigates the search results and identifies/purchases a product, the query log 80 may be updated with the query 44, result 56, and customer interaction data.

The ambiguity resolution module 84 may include a query rules module 98. The query rules module may include rules regarding the resolution of ambiguous query terms 44.

According the above examples, query rules may be added to the query rules module 98. Where the ambiguity resolution module 84 determines that "powershot" is the dominant form of a "powershot/power shot" candidate pair 90, a dominant form rule may be created that states that a query 44 containing the term "power shot" is modified such that the search engine performs the search using the term "powershot" instead. Similarly, a dominant form rule may be created that states that a query 44 containing the term "flatscreen" is analyzed by the search engine as if the query 44 instead contained the term "flat screen". An equivalent form rule may be created that states that a query 44 containing the term "breadmaker" or the term "bread maker" is analyzed in the same manner and includes results for both terms. An un-comparable form rule may be created that states that a query containing either of the "blade runner" or "bladerunner" terms is not modified and that results are provided according to the query 44 as entered by the customer.

In some examples, a query log 80 may be analyzed to identify candidate pairs 90, the candidate pairs 90 may be analyzed to determine if a dominant form 92, etc. is present, and rules may be created regarding the treatment of the unigrams or bigrams within a query to provide better search results to a customer. The rules may be stored in a query rules module 98. A new query 44 may then be modified according to the rules and the modified query may be analyzed by the search module 74 to identify documents/products according to their relevance to the modified query. Better results are provided to the customer.

Figure 10:
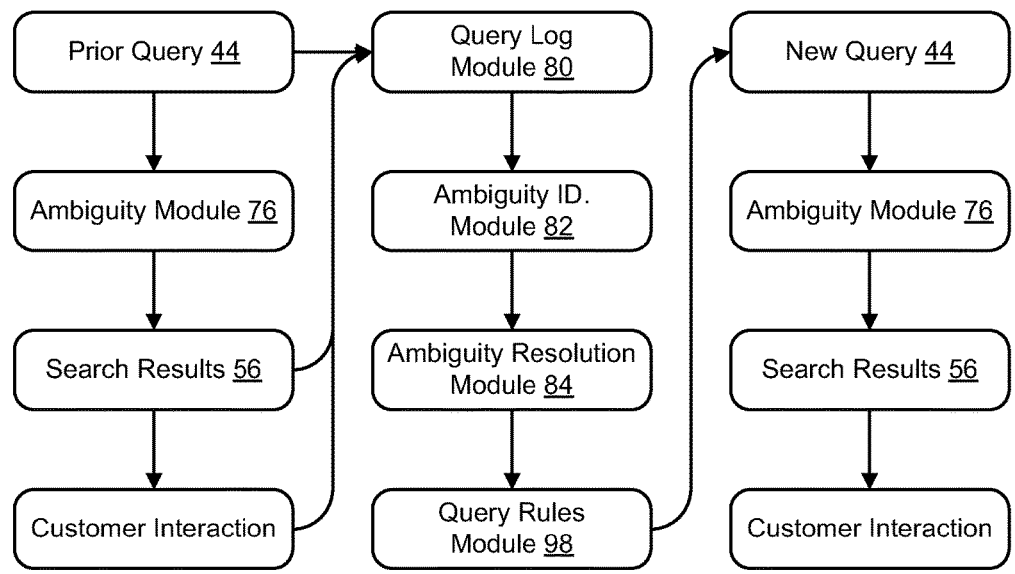
FIG. 10 is a schematic block diagram of a method that may be executed by a computer system in accordance with the present invention.

As shown in FIG. 10, customers may enter queries 44 into a server 38, such as via a search module 74. The server 38 may analyze the query in light of data pages on the store website or the like. The server 38 may then provide search results 56 to the customer. The customer may then navigate the search results 56 and may purchase a desired product. The query 44, search results 56, and customer interaction data (page views, navigation data, purchase data related to the result) may be stored in a query log 80 along with information from other previous queries 44, results 56, and related customer interaction. The query log 80 may then be used to update the ambiguity resolution module 76 by identifying unigram/bigram candidate pairs 90, resolving the candidate pairs, and creating query rules 98. The query rules 98 determine how particular query terms are analyzed by the search engine and are based on the degree of customer interaction with search results corresponding to the search term compared to another search term in a candidate pair. The query rules 98 may also be based on customer purchase of a product corresponding to a query 44 and search results 56.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer implemented method comprising:
a server obtaining a candidate pair from a query log, the candidate pair comprising a unigram and a bigram, the unigram being a single word of a first query in the query log, the bigram being two adjacent words of a second query in the query log, and the unigram being the two adjacent words of the bigram combined into a single word;
the server receiving first customer interaction data for a first customer interaction with first search results corresponding to the unigram from the query log, wherein the first customer interaction data comprises:
views, by a first customer, of products associated with the first search results; or
purchases, by the first customer, of products associated with the first search results;
the server receiving second customer interaction data for a second customer interaction with second search results corresponding to the bigram from the query log, wherein the second customer interaction data comprises:
views, by a second customer, of products associated with the second search results; or
purchases, by the second customer, of products associated with the second search results;
the server comparing the first customer interaction data corresponding to the unigram with the second customer interaction data corresponding to the bigram to:
determine if the candidate pair includes a dominant form for customer engagement based on either (1) the first customer interaction data corresponding to the unigram showing better customer interaction than the second customer interaction data corresponding to the bigram, or (2) the second customer interaction data corresponding to the bigram showing better customer interaction than the first customer interaction data corresponding to the unigram;
determine if the candidate pair includes equivalent forms for the customer engagement based on the first customer interaction data corresponding to the unigram showing equivalent customer interaction to the second customer interaction data corresponding to the bigram; and
determine if the candidate pair includes an un-comparable pair for the customer engagement based on the first customer interaction data corresponding to the unigram being related to a first product category and the second customer interaction data corresponding to the bigram being related to a second product category different from the first product category;
the server creating a rule regarding a treatment of the unigram or the bigram in analyzing future queries, the rule being one of a dominant form rule based at least in part on the candidate pair including the dominant form for the customer engagement, an equivalent form rule based at least in part on the candidate pair including the equivalent forms for the customer engagement, or an un-comparable form rule based at least in part on the candidate pair including the un-comparable pair for the customer engagement;
the server receiving a query;
the server analyzing the query according to the rule to identify query results; and
the server presenting the query results.

2. The method of claim 1, wherein the server analyzing the query according to the rule to identify the query results comprises:
the server modifying the query according to the rule to create a modified query; and
the server analyzing the modified query to identify the query results.

3. The method of claim 1, wherein:
the server comparing the first customer interaction data corresponding to the unigram with the second customer interaction data corresponding to the bigram comprises:
the server identifying the unigram as the dominant form for the customer engagement compared to the bigram based on the first customer interaction data corresponding to the unigram being higher than the second customer interaction data corresponding to the bigram;
the server creating the rule regarding the treatment of the unigram or the bigram in analyzing the future queries comprises:
the server creating the rule to treat the bigram as the unigram in analyzing the future queries;
the server receiving the query comprises:
the server receiving the query comprising the bigram; and
the server analyzing the query according to the rule to identify the query results comprises:
the server analyzing the query as though the query contained the unigram instead of the bigram.

4. The method of claim 1, wherein:
the server comparing the first customer interaction data corresponding to the unigram with the second customer interaction data corresponding to the bigram comprises:
the server identifying the bigram as the dominant form for the customer engagement compared to the unigram based on the second customer interaction data corresponding to the bigram being higher than the first customer interaction data corresponding to the unigram;
the server creating the rule regarding the treatment of the unigram or the bigram in analyzing the future queries comprises:
the server creating the rule to treat the unigram as the bigram in analyzing the future queries;
the server receiving the query comprises:
the server receiving the query comprising the unigram; and
the server analyzing the query according to the rule to identify the query results comprises:
the server analyzing the query as though the query contained the bigram instead of the unigram.

5. The method of claim 1, wherein:
the server comparing the first customer interaction data corresponding to the unigram with the second customer interaction data corresponding to the bigram comprises:
the server identifying the unigram and the bigram as the equivalent forms for the customer engagement based on the first customer interaction data corresponding to the unigram showing equivalent customer interaction to the second customer interaction data corresponding to the bigram;
the server creating the rule regarding the treatment of the unigram or the bigram in analyzing the future queries comprises:

the server creating the rule to treat the unigram and the bigram as equivalents in analyzing the future queries;

the server receiving the query comprises:
the server receiving the query comprising the unigram or the bigram; and the server analyzing the query according to the rule to identify the query results comprises:
the server analyzing the query to identify results relevant to the unigram and results relevant to the bigram.

6. The method of claim 1, wherein:
the server obtaining the candidate pair from the query log more specifically comprises:
the server analyzing the first query from the query log to identify the unigram;
the server analyzing the second query from the query log to identify the bigram; and
the server associating the unigram and the bigram to create the candidate pair.

7. The method of claim 1, wherein the bigram is a syntactical variation of the unigram.

8. The method of claim 1, wherein the query log comprises information regarding queries and associated query results.

9. A computer system comprising:
one or more processors; and
one or more non-transitory memory storage modules storing computing instructions configured to run on the one or more processors and perform acts of:
obtaining a candidate pair from a query log, the candidate pair comprising a unigram and a bigram, the unigram being a single word of a first query in the query log, the bigram being two adjacent words of a second query in the query log, and the unigram being the two adjacent words of the bigram combined into a single word;
receiving first customer interaction data for a first customer interaction with first search results corresponding to the unigram from the query log, wherein the first customer interaction data comprises:
views, by a first customer, of products associated with the first search results; or
purchases, by the first customer, of products associated with the first search results;
receiving second customer interaction data for a second customer interaction with second search results corresponding to the bigram from the query log, wherein the second customer interaction data comprises:
views of products associated with the second search results; or
purchases of products associated with the second search results;
comparing the first customer interaction data corresponding to the unigram with the second customer interaction data corresponding to the bigram to:
determine if the candidate pair includes a dominant form for customer engagement based on either (1) the first customer interaction data corresponding to the unigram showing better customer interaction than the second customer interaction data corresponding to the bigram, or (2) the second customer interaction data corresponding to the bigram showing better customer interaction than the first customer interaction data corresponding to the unigram;
determine if the candidate pair includes equivalent forms for the customer engagement based on the first customer interaction data corresponding to the unigram showing equivalent customer interaction to the second customer interaction data corresponding to the bigram; and
determine if the candidate pair includes an un-comparable pair for the customer engagement based on the first customer interaction data corresponding to the unigram being related to a first product category and the second customer interaction data corresponding to the bigram being related to a second product category different from the first product category;
creating a rule regarding a treatment of the unigram or the bigram in analyzing future queries, the rule being one of a dominant form rule based at least in part on the candidate pair including the dominant form for the customer engagement, an equivalent form rule based at least in part on the candidate pair including the equivalent forms for the customer engagement, or an un-comparable form rule based at least in part on the candidate pair including the un-comparable pair for the customer engagement;
receiving a query;
analyzing the query according to the rule to identify query results; and
presenting the query results.

10. The system of claim 9, wherein analyzing the query according to the rule to identify the query results comprises:
modifying the query according to the rule to create a modified query; and
analyzing the modified query to identify the query results.

11. The system of claim 9, wherein:
comparing the first customer interaction data corresponding to the unigram with the second customer interaction data corresponding to the bigram comprises:
identifying the unigram as the dominant form for the customer engagement compared to the bigram based on the first customer interaction data corresponding to the unigram being higher than the second customer interaction data corresponding to the bigram;
creating the rule regarding the treatment of the unigram or the bigram in analyzing the future queries comprises:
creating the rule to treat the bigram as the unigram in analyzing the future queries;
receiving the query comprises:
receiving the query comprising the bigram; and
analyzing the query according to the rule to identify the query results comprises:
analyzing the query as though the query contained the unigram instead of the bigram.

12. The system of claim 9, wherein:
comparing the first customer interaction data corresponding to the unigram with the second customer interaction data corresponding to the bigram comprises:
identifying the bigram as the dominant form for the customer engagement compared to the unigram based on the second customer interaction data corresponding to the bigram being higher than the first customer interaction data corresponding to the unigram;
creating the rule regarding the treatment of the unigram or the bigram in analyzing the future queries comprises:
creating the rule to treat the unigram as the bigram in analyzing the future queries;

receiving the query comprises:
receiving the query comprising the unigram; and
analyzing the query according to the rule to identify the query results comprises:
analyzing the query as though the query contained the bigram instead of the unigram.

13. The system of claim 9, wherein:
comparing the first customer interaction data corresponding to the unigram with the second customer interaction data corresponding to the bigram comprises:
identifying the unigram and the bigram as the equivalent forms for the customer engagement based on the first customer interaction data corresponding to the unigram showing equivalent customer interaction to the second customer interaction data corresponding to the bigram;
creating the rule regarding the treatment of the unigram or the bigram in analyzing the future queries comprises:
creating the rule to treat the unigram and the bigram as equivalents in analyzing the future queries;
receiving the query comprises:
receiving the query comprising the unigram or the bigram; and
analyzing the query according to the rule to identify the query results comprises:
analyzing the query to identify results relevant to the unigram and results relevant to the bigram.

14. The system of claim 9, wherein:
obtaining the candidate pair from the query log more specifically comprises:
analyzing the first query from the query log to identify the unigram;
analyzing the second query from the query log to identify the bigram; and
associating the unigram and the bigram to create the candidate pair.

15. The system of claim 9, wherein the bigram is a syntactical variation of the unigram.

16. The system of claim 9, wherein the query log comprises information regarding queries and associated query results.

17. The method of claim 1, wherein:
the server comparing the first customer interaction data corresponding to the unigram with the second customer interaction data corresponding to the bigram comprises the server identifying the unigram and the bigram as the un-comparable pair for the customer engagement based on the first customer interaction data corresponding to the unigram being related to the first product category and the second customer interaction data corresponding to the bigram being related to the second product category different from the first product category;
the server creating the rule regarding the treatment of the unigram or the bigram in analyzing the future queries comprises the server creating the rule to treat the unigram and the bigram as separate in analyzing the future queries;
the server receiving the query comprises the server receiving the query comprising the unigram or the bigram; and
the server analyzing the query according to the rule to identify the query results comprises the server analyzing the query to identify results relevant to the unigram or the bigram in the query.

18. The system of claim 9, wherein:
comparing the first customer interaction data corresponding to the unigram with the second customer interaction data corresponding to the bigram comprises identifying the unigram and the bigram as the un-comparable pair for the customer engagement based on the first customer interaction data corresponding to the unigram being related to the first product category and the second customer interaction data corresponding to the bigram being related to the second product category different from the first product category;
creating the rule regarding the treatment of the unigram or the bigram in analyzing the future queries comprises creating the rule to treat the unigram and the bigram as separate in analyzing the future queries;
receiving the query comprises receiving the query comprising the unigram or the bigram; and
analyzing the query according to the rule to identify the query results comprises analyzing the query to identify results relevant to the unigram or the bigram in the query.

19. The method of claim 8, wherein the query log further comprises the first customer interaction data and the second customer interaction data.

20. The system of claim 16, wherein the query log further comprises the first customer interaction data and the second customer interaction data.

21. The method of claim 1, wherein:
the server obtaining the candidate pair from the query log more specifically comprises:
the server analyzing the first query from the query log to identify the unigram;
the server analyzing the second query from the query log to identify the bigram; and
the server associating the unigram and the bigram to create the candidate pair;
the server analyzing the query according to the rule to identify the query results comprises:
the server modifying the query according to the rule; and
the server analyzing a modified query to identify the query results;
the bigram is a syntactical variation of the unigram;
the query log comprises information regarding queries and associated query results;
the query log further comprises the first customer interaction data and the second customer interaction data;
the server comparing the first customer interaction data corresponding to the unigram with the second customer interaction data corresponding to the bigram comprises the server identifying the unigram as the dominant form for the customer engagement compared to the bigram based on the first customer interaction data corresponding to the unigram being higher than the second customer interaction data corresponding to the bigram;
the server creating the rule regarding the treatment of the unigram or the bigram in analyzing the future queries comprises the server creating the rule to treat the bigram as the unigram in analyzing the future queries;
the server receiving the query comprises the server receiving the query comprising the bigram; and
the server analyzing the query according to the rule to identify the query results comprises the server analyzing the query as though it contained the unigram instead of the bigram.

22. The system of claim 9, wherein:
obtaining the candidate pair from the query log more specifically comprises:
analyzing the first query from the query log to identify the unigram;

analyzing the second query from the query log to identify the bigram; and associating the unigram and the bigram to create the candidate pair;

analyzing the query according to the rule to identify the query results comprises:

modifying the query according to the rule; and analyzing a modified query to identify the query results;

the bigram is a syntactical variation of the unigram;

the query log comprises information regarding queries and associated query results;

the query log further comprises the first customer interaction data and the second customer interaction data;

comparing the first customer interaction data corresponding to the unigram with the second customer interaction data corresponding to the bigram comprises identifying the unigram as the dominant form for the customer engagement compared to the bigram based on the first customer interaction data corresponding to the unigram being higher than the second customer interaction data corresponding to the bigram;

creating the rule regarding the treatment of the unigram or the bigram in analyzing the future queries comprises creating the rule to treat the bigram as the unigram in analyzing the future queries;

receiving the query comprises receiving the query comprising the bigram; and analyzing the query according to the rule to identify the query results comprises analyzing the query as though it contained the unigram instead of the bigram.

\* \* \* \* \*